United States Patent [19]

Grosselin et al.

[11] Patent Number: 4,870,885
[45] Date of Patent: Oct. 3, 1989

[54] DEVICE FOR CARRYING AND RELEASING A LOAD SUCH AS A MISSILE

[75] Inventors: Daniel Grosselin, Roissy; Pierre F. Coutin, Paris, both of France

[73] Assignee: R. Alkan & Cie, France

[21] Appl. No.: 202,068

[22] Filed: Jun. 3, 1988

[30] Foreign Application Priority Data

Jun. 5, 1987 [FR] France ................ 87 07889

[51] Int. Cl.⁴ ........................... F41F 3/06; F41F 7/00
[52] U.S. Cl. ................... 89/1.819; 89/1.806; 89/1.815
[58] Field of Search ............ 89/1.806, 1.815, 1.819, 89/1.8, 1.51, 1.53

[56] References Cited

U.S. PATENT DOCUMENTS

| | | | |
|---|---|---|---|
| 3,040,629 | 6/1962 | Duncan et al. | 89/1.806 |
| 4,008,645 | 2/1977 | Herbert | 89/1.51 |
| 4,423,661 | 1/1984 | Sheldon | 89/1.819 |
| 4,545,284 | 10/1985 | Piesik | 89/1.819 |
| 4,745,840 | 5/1988 | Long | 89/1.819 |
| 4,750,404 | 6/1988 | Dale | 89/1.819 |

*Primary Examiner*—David H. Brown
*Attorney, Agent, or Firm*—William A. Drucker

[57] ABSTRACT

A device is provided for carrying and releasing a load such as a missile, comprising front and rear rails for supporting respectively front and rear lugs of the load. The rails are joined together by rigid elements so as to form a mobile assembly which may move along longitudinal slides of the carrier member. This latter has fixed stops and retractable stops which cooperate with the load for preventing any translational movement thereof in the carrying position. The movement of the mobile assembly in its slides frees the load from the rails so that it may be released.

11 Claims, 2 Drawing Sheets

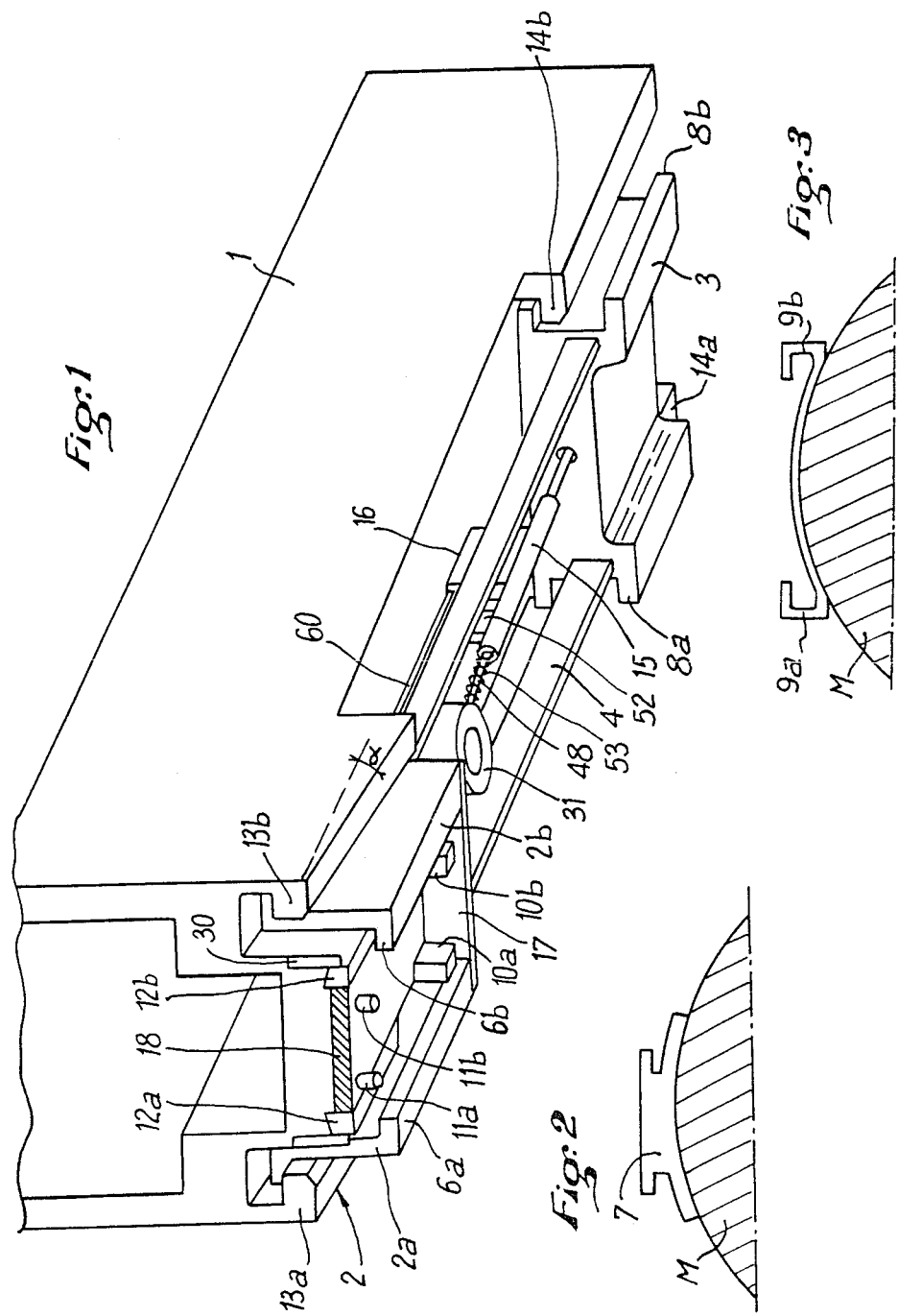

DEVICE FOR CARRYING AND RELEASING A LOAD SUCH AS A MISSILE

BACKGROUND OF THE INVENTION

1. Field of the Invention

The invention relates to the armament field, or to that of atmospheric probe devices. It relates to a device for carrying a load such as a missile under a carrying means, in particular under an element (wing or fuselage) of an aircraft, this device having to release the load and accessorily to eject it, i.e. to move it rapidly away from the carrier means. Following such release, the load may be self propelled or not.

2. Description of the Prior Art

From the U.S. Pat. No. 3,040,629, a carrying device for a missile is known equipped with front and rear coupling lugs. This device comprises coupling rails carried by the carrying member in which the lugs of the missile are engaged by sliding the missile along the rails. Disengagement of the missile takes place through the self propulsive force thereof, after a locking device has been put out of action. Furthermore, wedges take up the play between lugs and rails so as to avoid any parasite movement of the missile relative to the carrying member up to the moment of release. In addition, electric connections are provided by local bearing contact between the carrier member and the missile.

This device has the drawback of not being usable for releasing an inert load.

From the French patent published under the No. 2 573 383, a device is known for carrying and ejecting a load retained under a carrier member by means of lugs. For releasing, after unlocking a safety member, disengagement of the lugs from the fixed rails of the carrier member takes place through a translation-stop sequence of the load itself by means of a combined system comprising a pneumatic jack for moving the load in translation and a damper for stopping it. Furthermore, pneumatic ejection jacks are actuated by the same combined system, at the end of the stop sequence.

The device described in French patent No. 2 573 383 has the drawback of requiring the whole mass of the missile to be set in motion, followed immediately by a stop, which requires considerable energy and may cause stresses and even prejudicial shocks not only to the carrier member but also to the missile itself.

The purpose of the present invention is to overcome the above drawbacks presented by known systems, and to this end it provides a device for solving the problem of releasing the load such as a missile by moderate control forces and without displacement of the load.

SUMMARY OF THE INVENTION

According to the invention, the carrying and release device comprises a carrier member, which has front and rear rails supporting respectively coupling lugs situated at the front and at the rear of the load, and means for locking the load in a suspended position, and it is characterized in that said front and rear rails are connected together so as to form a mobile assembly adapted for moving along longitudinal slides on the carrier member, and in that fixed stops on the carrier member cooperating with the load prevent any translational movement thereof in the carrying position and during the release phase so that movement of said mobile assembly in its slides frees the lugs of the load from the rails so that the load can be released.

Advantageously, so as to avoid oscillations of the load in a transverse plane, wedges are placed between the rails of the carrier member and the lugs of the load at the front and/or at the rear.

To facilitate movement of the mobile assembly along the slides of the carrier member, in particular so as to avoid jamming when wedges are used, said slides may be slightly slanted in a direction such that the release sliding comprises a certain component causing the load to move away from the carrier member.

According to an additional characteristic of the invention, one at least of said fixed stops in spring loaded to retract into the carrier member so that the load may be positioned with the mobile assembly fixed in a carrying position, the load being raised in the offset position, by pushing the stop so as to retract it until the rails and lugs are opposite each other, the load then being moved longitudinally with introduction of the lugs in the rails until the stop is released which then plays its role, positioning itself for example in front of one of the lugs of the missile.

Advantageously, a manual control may be provided acting on the stop for retracting it and allowing the load to be withdrawn by the reverse operation. Such manual control for retracting the stop may actuate the separation of electric connections between the carrier member and the load, for example by withdrawing into the carrier member the corresponding part of a connector which may slide in this member.

Furthermore, a lever system actuated by the retractable stop may advantageously move a wedge aside so as to facilitate positioning of the load, then let it come back to its wedging position of release of the stop.

According to another feature of the invention, the device may comprise a safety key which, in an active position, simultaneously controls a pin for locking the mobile assembly in the carrying position, masks the manual control for retracting the stop, locks this latter positively, and if required, actuates a means indicating its position.

According to an important feature of the invention, the movement of the mobile assembly along the longitudinal slides of the carrier member is provided by the discharge of a pressurized gas on a control piston placed longitudinally in the carrier member, with, at the end of the release travel, opening of a passage for the same gas to actuate an ejection system, for example such as the one described in the French patent No. 2,597,553 of the applicant company. The distribution thus obtained of the ejection energy directly by the release piston at the end of its stroke provides in the most simple and reliable way the desired sequence, namely: release followed by ejection.

BRIEF DESCRIPTION OF THE DRAWINGS

For a better understanding of the device of the invention, a preferred embodiment thereof will be described hereafter by way of non-limitative example, with reference to the accompanying schematical drawings in which:

FIG. 1 is a simplified diagram in perspective of a missile carrying and release device of the invention, seen from below;

FIGS. 2 and 3 are partial vertical sectional views, respectively of the front part and of the rear part of a missile to be carried, showing more particularly the coupling lugs equipping it;

DESCRIPTION OF THE PREFERRED EMBODIMENTS

Figure 4:
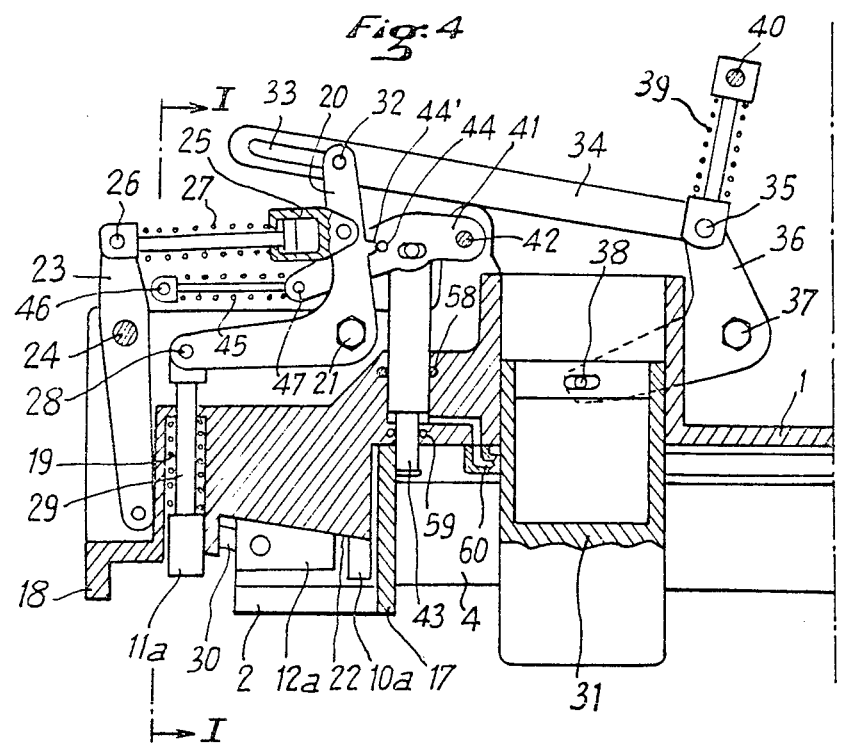
FIG. 4 is a partial longitudinal vertical sectional view of the device of FIG. 1, in the safety position.

Referring more particularly to FIG. 1, the device of the invention comprises a carrier member 1, fixed under an aircraft (not shown in drawing) and formed of a rigid elongate parallelepipedic assembly which is hollow for receiving members not shown, for example ejection members of the type described in the above mentioned French patent. The carrier member 1 supports a one-piece mobile assembly formed of a front rail 2, having two parts 2a and 2b joined together by a cross-piece 1 (visible in FIG. 4) and connected to a rear rail 3 by two rigid connecting elements 4 and 5.

The front rail 2a, 2b has flanges 6a and 6b facing each other which are intended to receive the lug 7 of the front support of a missle M, which lug is shown in FIG. 2 and in this example has a T shape. The rear rail 3 comprises outwardly directed flanges 8a, 8b which are adapted for cooperating with lugs 9a, 9b of the rear support of the missile M which face each other (see FIG. 3).

Furthermore, the missile is held in a fixed position relative to the carrier member 1 both by rear stops 10a, 10b which form part of this member and which are intended to cooperate with the rear of the lug 7 of the missile and retractable stops 11a, 11b positioned just in front of the lug 7 with the missile in its carrying position. It will be readily understood that, in order to engage missile M in its rails 2, 3, it must first of all be raised under the carrier member 1 in a slightly advanced position so that the rear of lug 7 raises stops 11a and 11b which retract into the carrier member. Then the missile is moved back by engaging the lugs thereof in the front and rear rails until the lug arrives against the rear stops 10a, 10b. Stops 11a, 11b then being disengaged projects so as to form a stop in front of lug 7.

Wedges have been further shown at 12a and 12b associated with the front part of the carrier member 1 for bearing against the upper face of lug 7 of the missile. The mechanism for actuating these wedges will be explained further on with reference to FIG. 4.

The missile, retained in a fixed position as explained above, is released by moving rearwardly the mobile assembly formed of rails 2, 3 and connecting elements 4, 5. For this, the rails 2, 3 slide in front 13a and 13b and rear 14a, 14b slides on the carrier member 1, by moving back until lugs 7, 9a, 9b are disengaged from the corresponding rails. This backward movement is provided by the action of a pneumatic jack 15 fixed to the carrier member 1 by an element 16 which, as will be explained in detail further on, comprises the arrival of pressurized propulsive gas.

It will be noted that, to prevent the wedges 12a, 12b from opposing this backward movement by a jamming action, the corresponding slides 13a, 13b are slanted through a small angle α which disengages lug 7 from the wedges.

As can be seen in FIG. 4, the carrier member 1 has a transverse projection 18. Its purpose is to precisely define the slightly advanced position which the missile must assume for coupling it, by then determining the position of the front face of lug 7. This latter, not shown in FIG. 4, is thus introduced between projection 18 and the front end of rail 2 and its upper faces pushes the retractable stop 11a back against the action of a return spring 19.

A crank lever 20, mounted for pivoting at its intermediate part 21 on the carrier member 1, is pivotally connected at 28 to an extension 29 of stop 11a. This lever 20 is connected, through a fork 25, rod 26 and spring 27 device to one end of a rocking lever 23 mounted for pivoting at 24 on the carrier member 1 and whose other end is connected, through a link 30 to the wedge 12a which slides along an inclined ramp 22 of the carrier member 1. It will be readily understood that retraction of stop 11a, when the lug 7 of the missile is placed in the coupling position, then controls retraction of wedge 12a. The fork joint 25, rod 26 and spring 27 device provides a possibility of compression of the spring 27 and so of a variable bearing force of wedge 12a under the joint action of springs 19 and 27 when, with the missile in its carrying position, stop 11a is not retracted.

Furthermore, the crank lever 20, during retraction of stop 11a, raises a retractable electric connector 31 which slides in a housing of the carrier member 1. For this, a shaft 32 carried by the end of the crank lever 20 is engaged in an oblong hole 33 formed in a link 34 mounted for pivoting at 35 to one end of a carnk lever 36 which is mounted for pivoting at 37 to the carrier member 1 and whose other end is pivotally mounted at 38 to connector 31. A spring 39, abutting against a fork joint mounted for pivoting at 40 to the carrier member 1 and bearing on the pivot point 35, holds the connector 31 in a raised position when the pivot point 35 crosses the alignment of shafts 37 and 40. The oblong hole 33 formed in link 34 then allows free movement of the crank lever 20.

In normal use, connector 31 is raised manually by a rotational action imparted to shaft 37 which is extended for this purpose by a hexagonal hole or similar means. Connector 31 can only be lowered and so connected when stop 11a is itself lowered for, if not, link 34 would abut against shaft 32. Stop 11a may also be operated manually by acting on shaft 21, with a hexagonal hole.

A safety locking system for the whole of the device is provided, which comprises a lever 41 pivoting about a fixed shaft 42. To this lever 41 is connected a finger 43 which, in the safety position of this lever shown in FIG. 4 retains the cross-piece 17 of the mobile assembly in the carrying position, preventing the backward movement of this mobile assembly. Lever 41 is controlled by an external key handle (not shown in the drawings) which, in the safety position, masks shaft 21 outwardly. Further, a pin 44, projecting from the safety lever 41, cooperates with a portion 44' of the crank lever 20 for locking it in the safety position in which stop 11a is in the low position. A compression spring 45, disposed between a fork joint pivoting at 46 on the carrier member 1 and the end of lever 41, provides stability of this lever in both its end positions in which its end 47 comes on each side of the alignment of shaft 42 and 46.

Finger 43 is formed by a double section cylinder which cooperates with seals 58, 59 in bores of the carrier member 1, seal 58 on the large section and the other seal 59 on the small section. Between these seals there opens a pneumatic duct 60, connected to a pressurized propulsive gas feed duct 49 contained in the fixing element 60 and visible in FIGS. 1 and 5. Under the pressure of the propulsive gas, finger 43 rises and frees the cross-piece 17, making release possible. Furthermore, an intermediate position of lever 41 may provide retention of cross-piece 17 without locking lever 20 and fingers 11, which makes it possible to couple the missile while avoiding the backward movement of the one-piece mobile assembly under the effect of the friction between the lugs and the rails.

Figure 5:
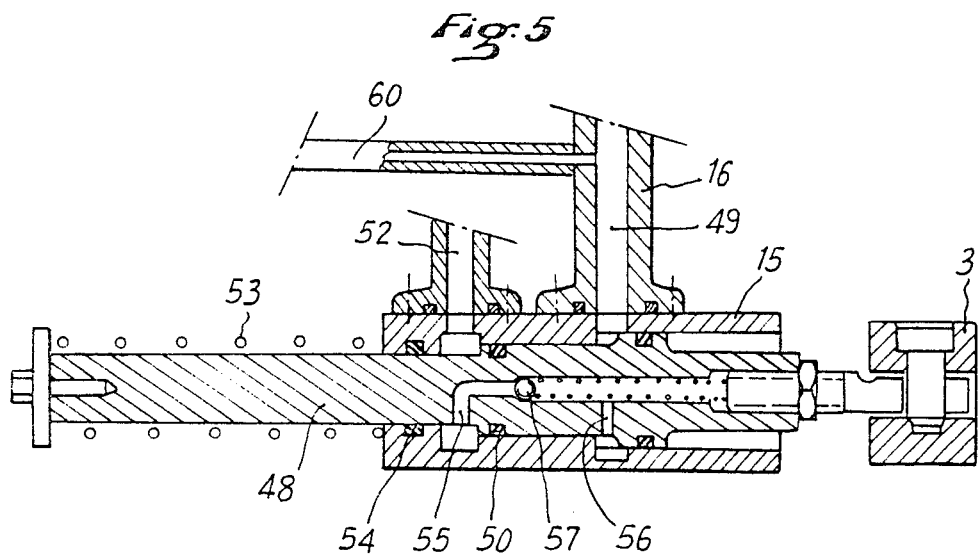
FIG. 5 is a vertical sectional diagram showing more particularly the release and ejection jack.

Referring to FIG. 5, the release and ejection jack will now be described. The jack body 15 as well as piston 48 have a triple section, so that the highly pressurized gas which arrives through duct 49 inside the fixing element 16 acts on the front face of the large section portion of the piston and pushes it, and so the mobile rail 3 which is connected thereto, rearwardly. At the end of this movement, the mobile seal 50, formed in the medium section portion of piston 48, passes beyond the orifice or duct 49 and uncovers an annular gap between the small section of cylinder 15 and piston 48, which allows the pressurized gas to penetrate into a duct 52 for actuating a device ejecting the missile (not shown in the drawings). A fixed seal 54 in the jack body cooperates with the small section portion of piston 48. Such an ejection device could preferably be the one described in the above mentioned French patent, jack 15 then forming part of the pressurized gas generating means shown at 28 in FIG. 1 of this French patent application No. 86 05517.

A compression spring 53, disposed between the front ends of the cylinder of the body of jack 15 and of piston 48, provides automatically the forward return of the mobile rail 3 and of the mobile assembly of which it forms part, when the pressurized gas feed through duct 49 is interrupted.

At the end of this return movement, duct 52 is placed under a minimum pressure by a return circuit comprising small section passages 55 and 56 bored in piston 48 which therefore connect ducts 52 and 49 together. A ball valve 57, disposed between passages 55 and 56, opposes the passage of the proulsive gas from duct 49 to duct 42, which makes possible the above described release movement.

The operation of the device of the invention is as follows. With the device in the position shown in FIG. 1, and with the electric connector 31 in the raised position and the safety lever 41 in the inactive position, the missile to be carried is coupled as already explained above, namely by raising the missile under the carrier member 1 so that lug 7 of the missile is disposed under the projection 18 and the front end of rail 2 while causing retraction of stops 11a, 11b by its rear end (which controls the retraction of wedges 12a, 12b), then by moving the missile back by sliding its lugs over rails 2, 3 until it engages with the fixed stops 10a, 10b (stops 11a, 11b coming back to the active position under the effect of their return springs 19, while at the same time causing positioning of the wedges.

If release of the missile thus coupled is not scheduled for the immediate future, lever 41 is then brought back into the safety position shown in FIG. 4 which simultaneously locks the mobile assembly in its carrying position by action of finger 43, masks the manual control 21 for retracting stops 11a, 11b and positively locks these latter by the action of pin 44. If, on the other hand, the aircraft under which the missile is secured, is to carry out a release mission, shaft 37 of lever 36 is manually actuated so as to cause connector 31 to be lowered and cooperate with electric connection member (not shown) of the missile. For releasing the missile, the operator controls the discharge of the pressurized gas through duct 49 which unlocks the one-piece mobile assembly by raising finger 43 and slides it rearwardly with, at the end of this travel, the automatic actuation of the ejection piston.

It will be readily understood tha the above description has been given soley by way of example, without any limitative character, and that additions or constructional modifications could be made thereto without departing from the scope or spirit of the present invention.

What is claimed is:

1. A device for carrying and releasing a load such as a missile under an aircraft, which comprises:
   (a) a carrier member fixed to the aircraft,
   (b) front and rear longitudinal slides on said carrier member,
   (c) front and rear rails connected together to form a mobile assembly and co-acting respectively with said front and rear longitudinal slides to move along said slides, the front and rear rails supporting coupling lugs situated at the front and at the rear of the load respectively,
   (d) means for locking the load in a suspended position to the rails preventing any translational movement thereof in a carrying position, said means for locking comprising at least one front stop engaging the front part of the load and retracting inside the carrier member under the action of a return spring and at least one fixed rear stop rigid with the carrier member and engaging the rear part of the load,
   (e) and means controlling a release movement of the mobile assembly along said longitudinal slides between the carrying position and a release position to free the lugs of the load from the rails so that the load can be released.

2. The device as claimed in claim 1 wherein the means for controlling a release movement of the mobile assembly comprise a pneumatic jack placed longitudinally in the carrier member, a feed duct providing pressurized gas to a control piston of the
   pneumatic jack and means responsive to the end of the release movement of the mobile assembly to connect said feed duct to a duct of the injection system.

3. The device as claimed in claim 2 wherein said control piston comprises internal passages which in the carrying position of the mobile assembly connect said duct of the ejection system to said feed duct, a ball valve being disposed between said internal passages to prevent flow of gas from the feed duct to the duct of the ejection system.

4. Device as claimed in claim 1 comprising wedging members associated with said carrier member for acting between the carrier member and the coupling lug at the front of the load.

5. Device as claimed in claim 4 wherein the longitudinal slides of the carrier member are slightly slanted in a direction disengaging the front coupling lug from the wedging members when the load is released.

6. Device as claimed in claim 4 wherein linkage means connect said front stop to said wedging members for moving said wedging members aside when said front stop is retracted and for letting said wedging members come back to their wedging position on release of the front stop.

7. Device as claimed in claim 1 wherein said front stop is connected to a pivoting lever having a member for manually controlling retraction of the front stop.

8. Device as claimed in claim 7 wherein said pivoting lever is connected to a pivoting member controlling a backward movement of an electric connection member.

9. The device as claimed in claim 7 wherein said lever has a projection which, in the safety position of the lever, engages a projection of the pivoting lever connected to the front stop for locking said front stop in an unretracted position.

10. Device as claimed in claim 16 comprising a movable lever having a finger which, in a safety position of said lever, locks the mobile assembly in the carrying position.

11. The device as claimed in claim 10 wherein wherein said lever has a projection which, in the safety position of the lever, engages a projection of the pivoting lever connected to the front stop for locking said front stop in an unretracted position.

* * * * *